United States Patent
Peng et al.

(10) Patent No.: US 12,437,802 B2
(45) Date of Patent: Oct. 7, 2025

(54) SIGNAL QUALITY OPTIMIZATION METHOD AND A SIGNAL QUALITY OPTIMIZATION SYSTEM

(71) Applicant: REALTEK SEMICONDUCTOR CORP., Hsinchu (TW)

(72) Inventors: Ming-Sheng Peng, Hsinchu (TW); Ting-Ying Wu, Hsinchu (TW); Shih-Hung Wang, Hsinchu (TW); Wei-Zhi Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 223 days.

(21) Appl. No.: 18/368,602

(22) Filed: Sep. 15, 2023

(65) Prior Publication Data
US 2024/0379152 A1 Nov. 14, 2024

(30) Foreign Application Priority Data

May 9, 2023 (TW) .................. 112117079

(51) Int. Cl.
| | |
|---|---|
| H03K 19/00 | (2006.01) |
| G11C 11/4093 | (2006.01) |
| G11C 29/54 | (2006.01) |
| H03K 19/0175 | (2006.01) |

(52) U.S. Cl.
CPC .......... *G11C 11/4093* (2013.01); *G11C 29/54* (2013.01); *H03K 19/0005* (2013.01)

(58) Field of Classification Search
None
See application file for complete search history.

(56) References Cited

U.S. PATENT DOCUMENTS

| | | | | |
|---|---|---|---|---|
| 7,986,161 | B2* | 7/2011 | Lee | H04L 25/0298 |
| | | | | 326/26 |
| 2015/0227440 | A1* | 8/2015 | Ojalvo | G06F 11/1604 |
| | | | | 714/700 |
| 2016/0204782 | A1* | 7/2016 | Lee | G11C 29/028 |
| | | | | 365/189.17 |
| 2024/0249788 | A1* | 7/2024 | Bak | G11C 29/50008 |

* cited by examiner

Primary Examiner — Anh Q Tran
(74) Attorney, Agent, or Firm — Li & Cai Intellectual Property (USA) Office

(57) ABSTRACT

A signal quality optimization system and a signal quality optimization method are provided. The method includes: executing a ZQ calibration process on an off-chip driver (OCD) circuit of a first circuit and an on-die termination (ODT) circuit of a second circuit to obtain calibrated resistor quantities; performing a waveform test process, including: setting a predetermined time rule to determine an operation success condition, adjusting the OCD circuit according to the calibration calibrated quantity corresponding to a target ODT resistance, obtaining a signal eye diagram, and obtaining an adjustable resistor ratio by performing adjustments and tests; extracting the OCD resistance value with the highest adjustable resistor ratio to obtain preferred ODT-OCD resistance combinations; and configuring the ODT circuit and the OCD circuit according to the preferred ODT-OCD resistance combinations, and testing the preferred ODT-OCD resistance combinations to obtain an optimized ODT-OCD resistance combination according to test results.

20 Claims, 6 Drawing Sheets

SIGNAL QUALITY OPTIMIZATION METHOD AND A SIGNAL QUALITY OPTIMIZATION SYSTEM

CROSS-REFERENCE TO RELATED PATENT APPLICATION

This application claims the benefit of priority to Taiwan Patent Application No. 112117079, filed on May 9, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optimization method and an optimization system, and more particularly to a signal quality optimization method and a signal quality optimization system.

BACKGROUND OF THE DISCLOSURE

For signals specified in the Open NAND Flash Interface (ONFI) standard, fixed reference voltages are inputted to adjust a reference voltage VREFDQ for calibration, instead of using a mode register as in a DDR4 specification. Therefore, it is impossible to know how signals are realistically exhibited in an eye diagram without inputting a voltage with variable level from the outside.

On-Die Termination (ODT) is a technology used to perform impedance matching between an output impedance of a dynamic random-access memory (DRAM) and a termination impedance of a system on a transmission line. The selection of the ODT is very important for performance and signal stability of the DRAM. In ZQ calibration, the DRAM will send a calibration signal in a specific mode, so as to ensure stability and reliability of an output signal by performing adjustments according to a readout ODT resistance.

Off-Chip Driver (OCD) is an output driver calibration technology used to adjust a strength and a voltage of an output driver. In the ZQ calibration, the DRAM will send a specific calibration signal, and then adjust the strength and voltage of the output driver by measuring a feedback of this signal, so as to ensure stability and reliability of the output signal.

For the existing OCD circuit, when choosing the ZQ calibrated resistance, since an eye width under a fixed reference voltage VREFDQ can only be obtained by testing, and reflected signals are difficult to eliminate due to the large quantity of NAND Flash chips, a group of unsafe resistances with sufficient eye width but with insufficient eye height may be selected.

SUMMARY OF THE DISCLOSURE

In response to the above-referenced technical inadequacies, the present disclosure provides a signal quality optimization method and a signal quality optimization system to improve a resistance setting of a ZQ calibration under a condition that externally input reference voltage cannot be changed, thereby predicting possible eye width and eye height to optimize signal quality.

In one aspect, the present disclosure provides a signal quality optimization method applicable to a first circuit and a second circuit electrically connected to each other, and the signal quality optimization method includes: executing a ZQ calibration process on an off-chip driver (OCD) circuit of the first circuit and an on-die termination (ODT) circuit of the second circuit through a ZQ calibration circuit, so as to obtain a plurality of calibrated resistor quantities corresponding to a plurality of OCD resistances and a plurality of corrected ODT resistances, in which a plurality of ODT-OCD resistance combinations define relationships between the corrected ODT resistances and the OCD resistances; configuring a processing device to perform a waveform test process for each of the ODT-OCD resistance combinations, in which the waveform test process includes: setting a predetermined time rule to determine an operation success condition between the first circuit and the second circuit; and adjusting the OCD circuit according to the calibrated resistor quantity corresponding to a target ODT resistance, transmitting a group of test signals between the second circuit and the first circuit, obtaining a signal eye diagram corresponding to the group of test signals, and obtaining an adjustable resistor ratio corresponding to the target ODT resistance by performing repeated adjustments and tests. The signal quality optimization method further includes: configuring the processing device to extract the OCD resistance with the highest adjustable resistor ratio for the different ODT resistances, so as to obtain a plurality of preferred ODT-OCD resistance combinations; and configuring the processing device to configure the ODT circuit and the OCD circuit according to the preferred ODT-OCD resistance combinations, and performing an operation test process for multiple times on the first circuit and the second circuit, so as to obtain an optimized ODT-OCD resistance combination according to test results of the operation test process that is performed for multiple times.

In another aspect, the present disclosure provides a signal quality optimization system, which includes a first circuit, a second circuit, a ZQ calibration circuit and a processing device. The first circuit includes an OCD circuit. The second circuit includes an ODT circuit. The ZQ calibration circuit is electrically connected to the OCD circuit and the ODT circuit, the ZQ calibration circuit is configured to execute a ZQ calibration process to obtain a plurality of calibrated resistor quantities corresponding to a plurality of OCD resistances and a plurality of corrected ODT resistances, and a plurality of ODT-OCD resistance combinations define relationships between the corrected ODT resistances and the OCD resistances. The processing device is configured to execute a waveform test process for each of the ODT-OCD resistance combinations, and the waveform test process includes: setting a predetermined time rule to determine an operation success condition between the first circuit and the second circuit; and adjusting the OCD circuit according to the calibrated resistor quantity corresponding to a target ODT resistance, transmitting a group of test signals between the second circuit and the first circuit, obtaining a signal eye diagram corresponding to the group of test signals, and obtaining an adjustable resistor ratio corresponding to the target ODT resistance by performing repeated adjustments and tests. The processing device is further configured to: extract the OCD resistance value with the highest adjustable resistor ratio for the different ODT resistances, so as to obtain a plurality of preferred ODT-OCD resistance combinations; and configuring the processing device to configure the ODT circuit and the OCD circuit according to the preferred ODT-OCD resistance combinations, and performing an operation test process for multiple times on the first circuit and the second circuit, so as to obtain an optimized ODT-OCD resistance combination according to test results of the operation test process that is performed for multiple times.

Therefore, in the signal quality optimization method and signal quality optimization system provided by the present disclosure, maximum and minimum values of pull-up resistors (or pull-down resistors) that can meet the self-defined time specification can be counted by adjusting a quantity of OCD resistors, and an available range that each OCD resistance has can be calculated and obtained, so as to automatically find the best OCD-ODT resistance combination, which ensures the signal quality exhibited by the corresponding eye diagram.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
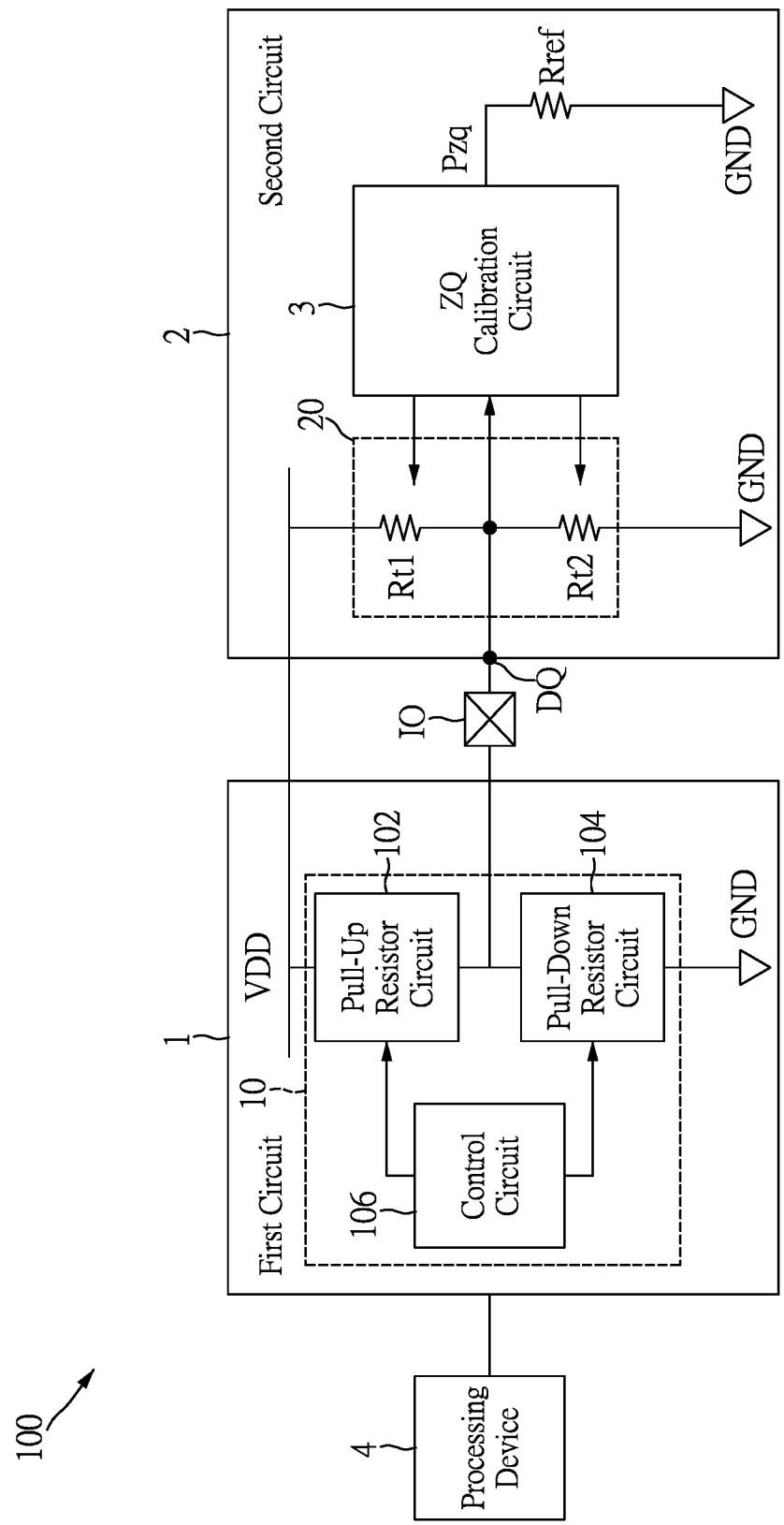
FIG. 1 is a schematic diagram of a signal quality optimization system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a schematic diagram of a signal quality optimization system according to one embodiment of the present disclosure. Reference is made to FIG. 1, in which one embodiment of the present disclosure provides a signal quality optimization system 100, including a first circuit 1, a second circuit 2, a ZQ calibration circuit 3 and a processing device 4.

The first circuit 1 includes an off-chip driver (OCD) circuit 10, which can be, for example, a memory controller circuit that is applicable to a double data rate synchronous dynamic random access memory (DDR SDRAM). More particularly, the first circuit 1 can be the memory controller circuit that is applicable to, for example, second-generation and third-generation DDR SDRAMs (DDR2 and DDR3), and can also be applied to fourth-generation DDR SDRAMs (DDR4). A memory controller usually includes a memory controller core, a controller physical layer, a control signal generator, a memory interface, and a memory controller interface. The memory controller core is a processor that controls DDR2 or DDR3 memory, and is responsible for processing instructions from a CPU, and controlling timing and sequence of memory operations. The controller physical layer can convert digital signals into analog signals, and convert analog signals into digital signals, and is responsible for processing memory timing and sequence to ensure that data can be transmitted accurately. The OCD circuit 10 can be used to adjust the signals of the controller physical layer, for example, the OCD circuit 10 usually monitors the signals of the controller physical layer and makes minor adjustments to ensure signal integrity and signal reliability.

The control signal generator can be used to generate and transmit various control signals required by the memory controller. The memory interface can convert the signals sent by the controller into the signals required by the memory, and convert the signals sent by the memory into the signals required by the controller. The memory controller interface is a module responsible for connecting the memory controller with other system components (such as the CPU, southbridge, northbridge and the like).

Figure 2:
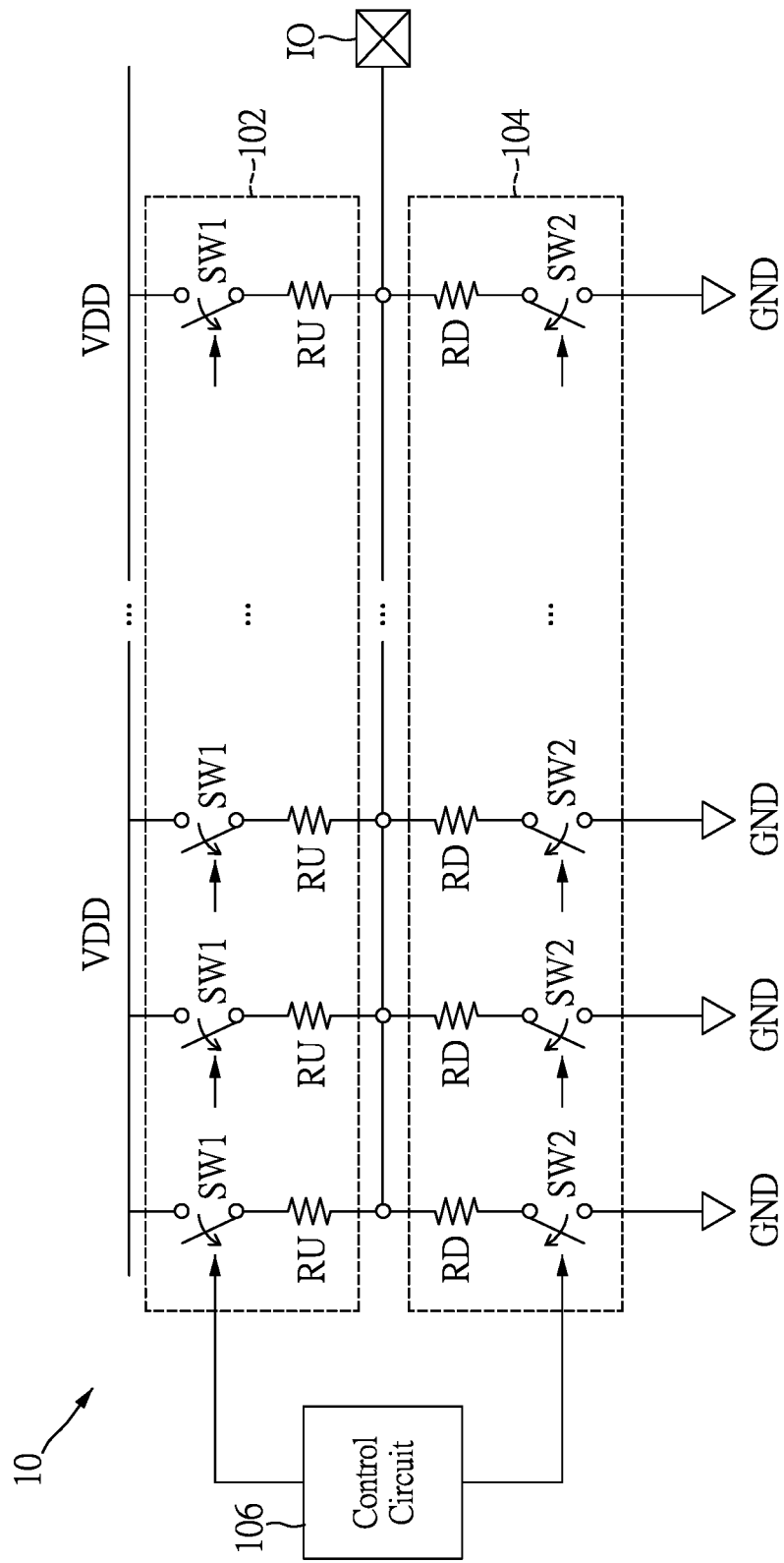
FIG. 2 is a schematic circuit diagram of an OCD circuit according to one embodiment of the present disclosure.

Reference is further made to FIG. 2, which is a schematic circuit diagram of an OCD circuit according to one embodiment of the present disclosure. As shown in FIG. 2, the OCD circuit 10 includes a pull-up resistor circuit 102 and a pull-down resistor circuit 104. The pull-up resistor circuit 102 includes a plurality of pull-up resistors RU and a plurality of first control switches SW1. Each pull-up resistor RU and its corresponding first control switch SW1 are connected in series between the power supply voltage VDD and an input\output terminal IO. The pull-down resistor circuit 104 includes a plurality of pull-down resistors RD and a plurality of second control switches SW2 respectively corresponding to the pull-down resistors RD. Each of the pull-down resistors RD and its corresponding second control switch SW2 are connected in series between the input\output terminal IO and a ground terminal GND.

The OCD circuit 10 further includes a control circuit 106 configured to control the first control switch SW1 and the second control switch SW2, so as to adjust a pull-up resistor quantity and a pull-down resistor quantity.

On the other hand, the second circuit 2 can be, for example, a memory circuit such as a DDR SDRAM. More particularly, the second circuit 2 can be a second-generation or a third-generation DDR SDRAMs (DDR2 and DDR3), or can be a fourth-generation DDR SDRAMs (DDR4). The second circuit 2 can include an on-die termination (ODT) circuit 20, and the ODT circuit 20 can include a plurality of reference resistors Rt1, Rt2 that are electrically connected to the input\output terminal IO, and the ODT circuit 20 is not limited to a circuit structure of FIG. 1.

The ZQ calibration circuit 3 is electrically (directly or indirectly) connected to the OCD circuit 10 and the ODT circuit 20, and is configured to perform a ZQ calibration process on the OCD circuit 10 and the ODT circuit 20. In the ZQ calibration process, the memory circuit (the second circuit 2) will send a calibration signal in a specific mode, by reading an ODT resistance and making adjustments according to the ODT resistance, so as to ensure stability and reliability of an output signal. The ODT matching technique can be performed on each data pin DQ (e.g., the input/output terminal IO) of the memory circuit (the second circuit 2). In this case, resistors corresponding to each data pin in the ODT circuit 20 should have correct resistances.

The ZQ calibration circuit 3 can provide the second circuit 2 with a ZQ pin Pzq, on which a 240 ohm low-tolerance reference resistor Rref is connected. This pin can be used to automatically verify an on-resistance of the output driver and a termination resistance value of the ODT circuit through a command set and an on-die calibration engine (ODCE).

In addition, in the ZQ calibration process, the memory circuit (second circuit 2) will send a specific calibration signal to the memory controller circuit (first circuit 1), and then adjusts the strength and voltage of the output driver by measuring a feedback of this signal, so as to ensure stability and reliability of the output signal.

Since the data pin (that is, the input\output terminal IO) is coupled to the memory controller circuit (the first circuit 1) through a pad, resistance calibration on the OCD circuit 10 can be achieved by a correct resistance of a corresponding data pin in the memory circuit (the second circuit 2). The resistors Rt1 and Rt2 on the data pin can be regarded as reference resistors, which are used to provide reference resistances required by the calibration of the OCD circuit 10.

It should be noted that in the signal quality optimization system 100 provided by the present disclosure, the OCD circuit 10, the ODT circuit 20, and the ZQ calibration circuit 3 used for OCD, ODT, and ZQ calibrations are not limited to a configuration shown in FIG. 1. The memory circuit (second circuit 2) and the controller circuit (first circuit 1) can both be configured with the OCD circuit 10, the ODT circuit 20 and the ZQ calibration circuit 3 to perform OCD, ODT and ZQ calibrations, respectively.

As shown in FIG. 1, the processing device 4 can be electrically (directly or indirectly) connected to the first circuit 1 and the second circuit 2. It should be noted that the processing device 4 can be, for example, a host terminal, and the memory controller circuit (first circuit 1) is usually implemented as an intellectual property (IP) core in a system of the host terminal, and is used to control the host terminal to access the memory circuit (such as DDR SDRAM). The host terminal (processing device 4) can include various of digital processing systems, such as embedded systems, personal computers, mobile phones. The memory circuit can be connected to other IP cores through an external bus, so as to realize data exchange and control with other parts of the processing device 4. In addition, the processing device 4 can include a processor, such as a central processing unit (CPU), and the memory controller circuit (the first circuit 1) is usually connected to the CPU through a northbridge chip, and controls access of the memory circuit through a CPU interface.

Figure 3:
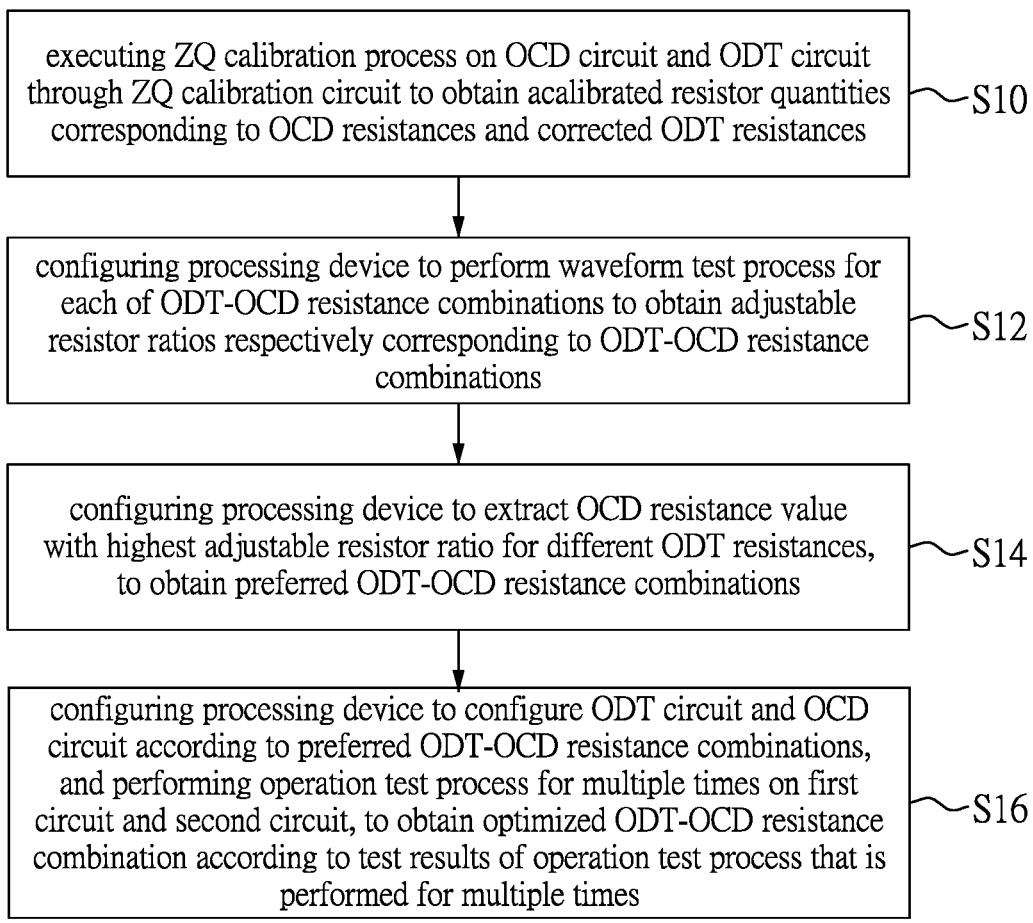
FIG. 3 is a flowchart of a signal quality optimization method according to one embodiment of the present disclosure.

Reference is made to FIG. 3, which is a flowchart of a signal quality optimization method according to one embodiment of the present disclosure. As shown in FIG. 3, the signal quality optimization method of the present disclosure can be applied to the aforementioned signal quality optimization system 100, and can include the following steps:

Step S10: executing a ZQ calibration process on the OCD circuit and the ODT circuit through the ZQ calibration circuit, so as to obtain a plurality of calibrated resistor quantities corresponding to a plurality of OCD resistances and a plurality of corrected ODT resistances.

In detail, the ZQ calibration process can be performed based on the following steps: a calibration signal transmitted between the reference signal and a calibration signal transmitted between the memory controller circuit (the first circuit 1) and the memory circuit (the second circuit 2) are compared by a comparator, and resistances of the reference resistors Rt1 and Rt2 are adjusted by a ZQ calibration controller in the ZQ calibration circuit 3 according to a comparison result (i.e., pull-up/pull-down resistor calibration), so as to adjust the calibration signal until a voltage of the calibration signal is equal to or almost equal to the reference voltage. After the calibration of the ODT circuit 20 is completed and the corrected multiple ODT resistances are obtained, the memory circuit (second circuit 2) will further send a specific calibration signal to the memory controller circuit (first circuit 1), and adjust the resistances of the OCD circuit 10 by measuring a feedback of the specific calibration signal, so as to obtain calibrated resistor quantities corresponding to specific resistances based on a premise that stability and reliability of the output signal are ensured. The calibrated resistor quantities can include a calibrated pull-up resistor quantity and a calibrated pull-down resistor quantity. The calibrated pull-up resistor quantity is a quantity of the first switches SW1 turned on in the pull-up resistor circuit 102 under a specific resistance, and the calibrated pull-down resistor quantity is a quantity of the second switches SW2 turned on in the pull-down resistor circuit 104 under another specific resistance.

In addition, after the ZQ calibration process is completed, the calibrated resistor quantities corresponding to the OCD resistances and the calibrated ODT resistances can be obtained. Moreover, a plurality of ODT-OCD resistance combinations define a corresponding relationship between the ODT resistance values and the OCD resistance values. For example, the ODT resistances can include four resistances of 150, 100, 75, and 50 ohms, and the OCD resistances can include four resistance values of 50, 35, 25, and 18 ohms. According to the above description, the total number of the ODT-OCD resistance combinations is 16, and each of the ODT-OCD resistance combinations corresponds to one calibrated resistor quantity (that is, corresponds to a calibrated pull-up resistor quantity and a calibrated pull-down resistor quantity).

For example, after the ZQ calibration process, a result of the OCD resistance of 50 ohms shows that the calibrated pull-up resistor quantity is 32 and the calibrated pull-down resistor quantity is 28; a result of the OCD resistance of 35 ohms shows that the calibrated pull-up resistor quantity is 48 and the calibrated pull-down resistor quantity is 40; a result of the OCD resistance of 25 ohms shows that the calibrated pull-up resistor quantity is 64 and the calibrated pull-down resistor quantity is 58; a result of the OCD resistance of 18 ohms shows that the calibrated pull-up resistor quantity is 95 and the calibrated pull-down resistor quantity is 82.

However, under certain architectures that an external input voltage cannot be changed (for example, DDR2 or DDR3), it is impossible to know how the signals are realistically exhibited in an eye diagram. Moreover, when choosing the ZQ calibrated resistance, since an eye width under a fixed reference voltage VREFDQ can only be obtained by testing, whether the corresponding eye diagram has a sufficient eye height cannot be determined. That is, the calibrated pull-up resistor quantity and the calibrated pull-down resistor quantity after calibration can only ensure sufficient eye width. Therefore, it is necessary to further use statistical methods to confirm an optimal ODT-OCD combination to ensure that the signal exhibits sufficient eye width and eye height in the eye diagram.

The signal quality optimization method proceeds to the following steps:

Step S12: configuring the processing device to perform a waveform test process for each of the ODT-OCD resistance combinations, so as to obtain adjustable resistor ratios respectively corresponding to the ODT-OCD resistance combinations.

Figure 4:
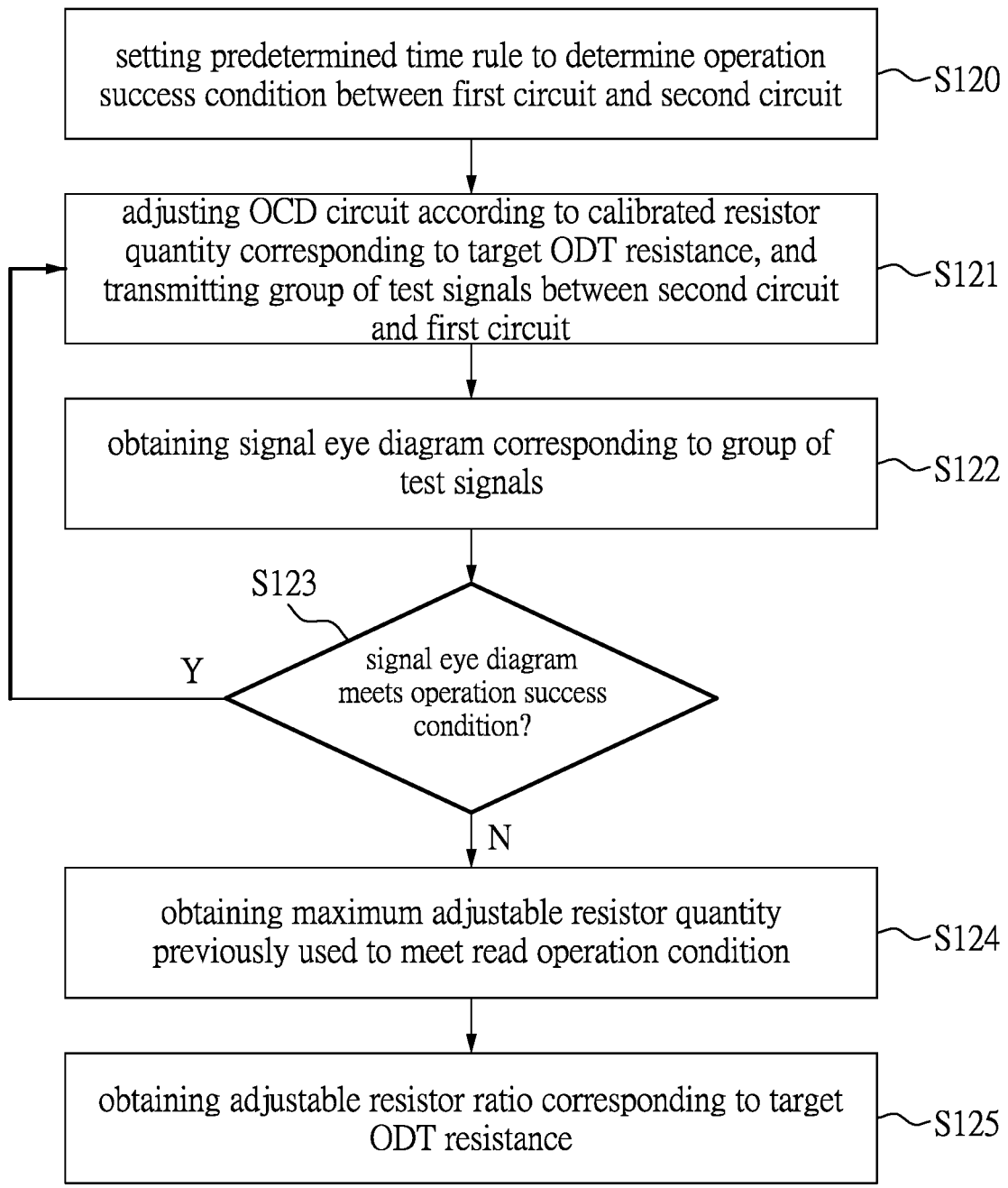
FIG. 4 is a flowchart of a waveform test process according to one embodiment of the present disclosure.

Reference is made to FIG. 4, which is a flowchart of a waveform test process according to one embodiment of the present disclosure. As shown in FIG. 4, the waveform test process includes:

Step S120: setting a predetermined time rule to determine an operation success condition between the first circuit and the second circuit. For example, at a predetermined test frequency (for example, a test frequency is first fixed to 533 MHz), the memory controller circuit (first circuit 1) is configured to perform a write operation on the memory circuit (second circuit 2), and the operation success condition is a write success condition, and its corresponding predetermined time rule can be set to 13 PI (time unit).

Step S121: adjusting the OCD circuit according to the calibrated resistor quantity corresponding to a target ODT resistance, and transmitting a group of test signals between the second circuit and the first circuit. In detail, the OCD circuit 10 can be adjusted by gradually increasing the pull-up resistor quantity while gradually decreasing the pull-down resistor quantity, or by gradually decreasing the pull-up resistor quantity while gradually increasing the pull-down resistor quantity.

Figure 5:
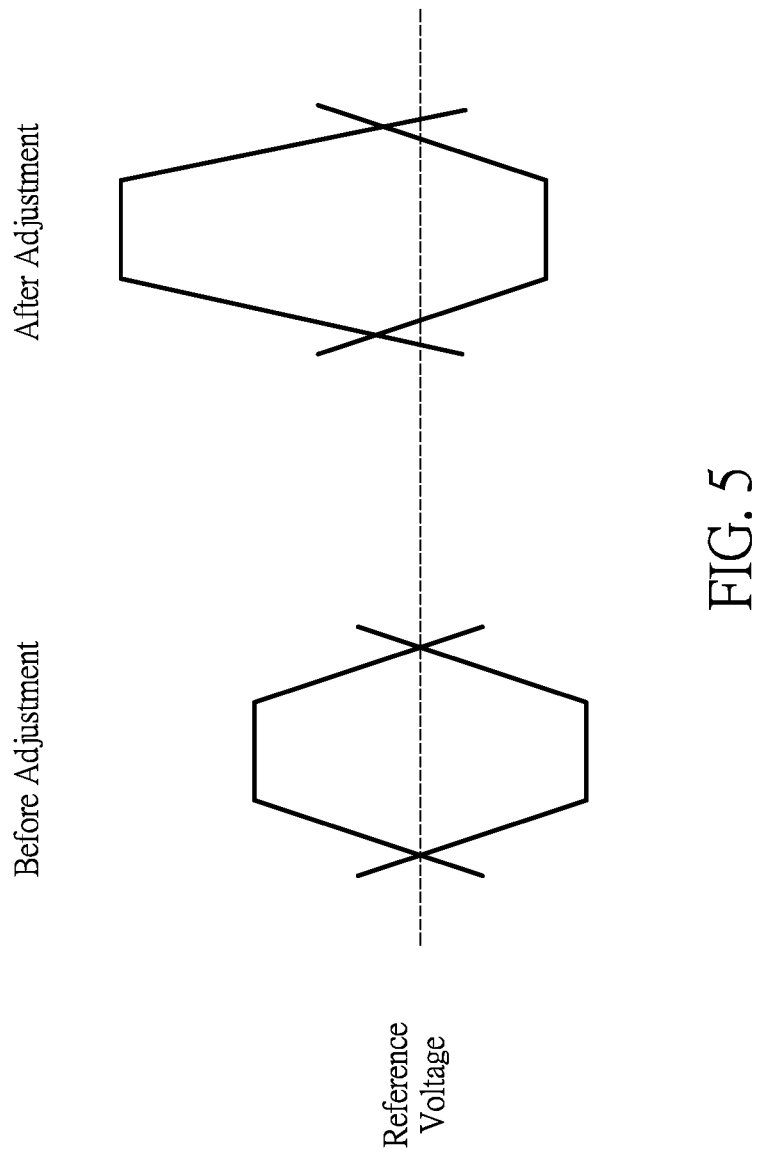
FIG. 5 is a schematic waveform diagram showing signals of a data pin DQ affected by increasing a quantity of pull-up resistors and decreasing a quantity of pull-down resistors.

For example, the ODT resistance being 150 ohms serves as the target ODT resistance, when the OCD resistance is 35 ohms, the calibrated pull-up resistor quantity and the calibrated pull-down resistor quantity can be obtained after the ZQ calibration process. When testing an available tune-up range of the eye diagram, the calibrated pull-up resistor quantity corresponding to the OCD resistance being 35 ohms is taken as a reference to increase a quantity of the turned-on pull-up resistors RU one by one, and at the same time decrease a quantity of the turned-on pull-down resistors RD one by one, which is similar to directly decreasing a level of the external reference voltage. Reference is made to FIG. 5, which is a schematic waveform diagram showing signals of a data pin DQ affected by increasing a quantity of pull-up resistors and decreasing a quantity of pull-down resistors.

On the contrary, when testing an available tune-down range of the eye diagram, the calibrated pull-down resistor quantity corresponding to the OCD resistance being 35 ohms is taken as a reference to increase the quantity of the turned-on pull-down resistors DU one by one, and at the same time decrease the quantity of the turned-on pull-up resistors RD one by one, which is similar to directly increasing the level of the external reference voltage. Through the above method, the signal quality presented by the eye diagram in a voltage direction (i.e., a second dimensional direction) when a level of the reference voltage changes can be simulated.

Step S122: obtaining a signal eye diagram corresponding to the group of test signals.

Step S123: determining whether or not the signal eye diagram meets the operation success condition.

In this step, it is mainly determined whether or not an eye width of the signal eye diagram is greater than a predetermined time rule. If so, the signal optimization method proceeds back to step S121, and if not, the signal optimization method proceeds to step S124.

After repeated adjustments and tests, when it is determined that the signal eye diagram does not meet the operation success condition, the method proceeds to step S124: obtaining a maximum adjustable resistor quantity previously used to meet the read operation condition. The maximum adjustable resistor quantity includes a maximum tune-up resistor quantity and a maximum tune-down resistor quantity, the maximum tune-up resistor quantity includes a tune-up pull-up resistor quantity and a tune-up pull-down resistor quantity, and the maximum tune-down resistor quantity includes a tune-down pull-up resistor quantity and a tune-down pull-down resistor quantity.

For example, when the pull-up resistor quantity increases by 6 and the pull-down resistor quantity decreases by 6 at the same time, the eye width presented in the eye diagram is greater than 13 PI, and the eye width can still meet the predetermined time rule. When the pull-up resistor quantity increases by 7 and the pull-down resistor quantity decreases by 7 at the same time, the eye width is less than 13 PI, and the predetermined time rule cannot be met. Therefore, after the pull-up resistor quantity and the pull-down resistor quantity are further tuned and being found out incapable of meeting the predetermined time rule, the pull-up resistor quantity increased by 6 and the pull-down resistor quantity decreased by 6 previously used are taken as the tune-up pull-up resistor quantity and the tune-up pull-down resistor quantity included in the maximum tune-up resistor quantity, respectively. Based on a similar method, an adjustment is made downwards by taking the calibrated pull-down resistor quantity as a reference, so as to obtain that the pull-up resistor quantity decreased by 2 and the pull-down resistor quantity increased by 2 previously used to meet the predetermined time rule can be respectively taken as the tune-down pull-up resistor quantity and the tune-down pull-down resistor quantity included in the maximum tune-down resistor quantity.

Step S125: obtaining the adjustable resistor ratio corresponding to the target ODT resistance.

For example, this step is to calculate and obtain an average adjustable resistor ratio according to the maximum adjustable resistor quantity, the calibrated pull-up resistor quantity and the calibrated pull-down resistor quantity, to serve as the adjustable resistor ratio.

Figure 6:
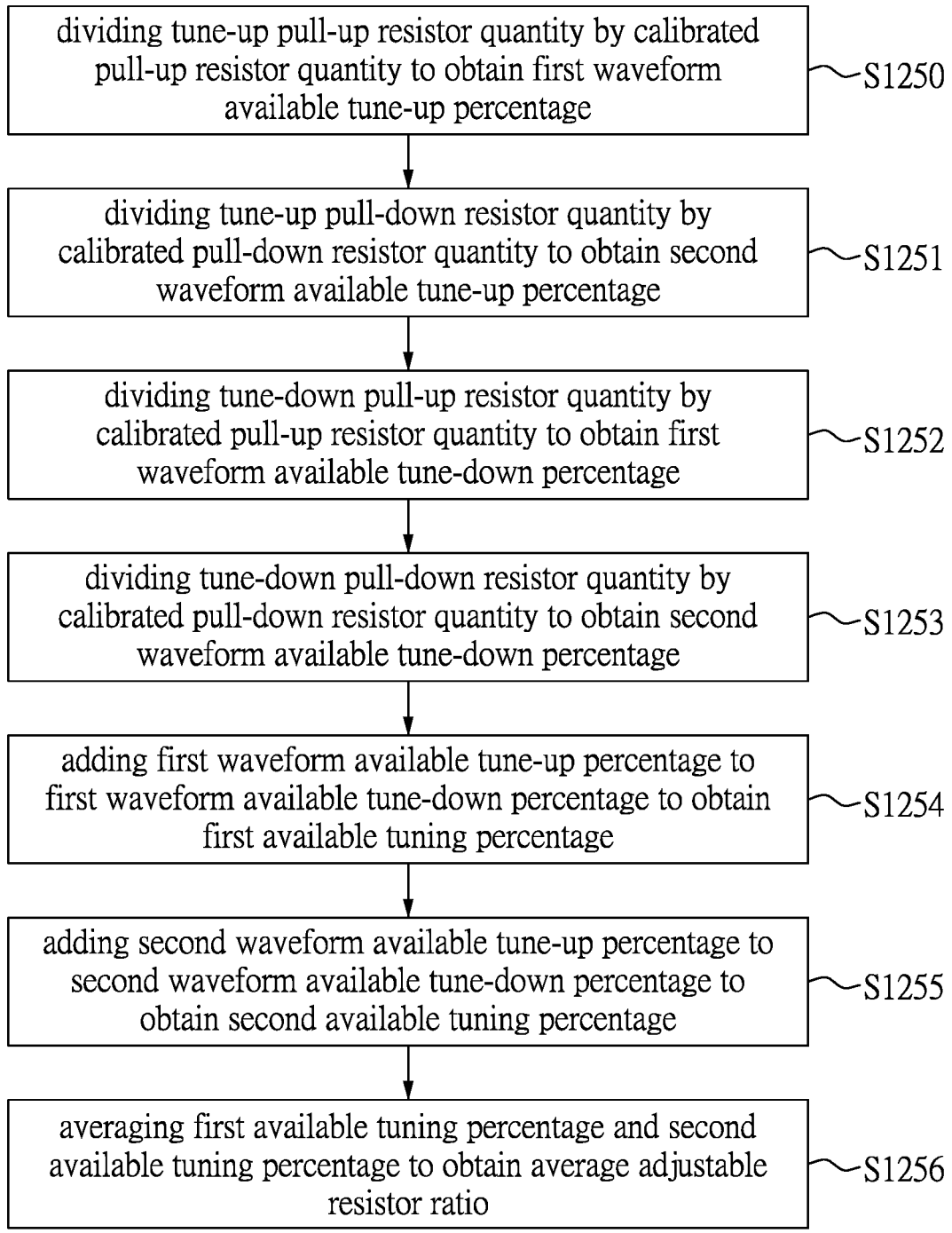
FIG. 6 is a detailed flowchart of step S125 according to one embodiment of the present disclosure.

Reference is made to FIG. 6, which is a detailed flowchart of step S125 according to one embodiment of the present disclosure. As shown in FIG. 6, step S125 can include the following steps:

Step S1250: dividing the tune-up pull-up resistor quantity by the calibrated pull-up resistor quantity to obtain a first waveform available tune-up percentage.

Step S1251: dividing the tune-up pull-down resistor quantity by the calibrated pull-down resistor quantity to obtain a second waveform available tune-up percentage. For example, when the OCD resistance value is 50 ohms, the tune-up pull-up resistor quantity is 6, and the tune-up pull-down resistor quantity is 6. Therefore, the first waveform available tune-up percentage is 6/32=18.8%, and the second waveform available tune-up percentage is 6/28=21.4%.

Step S1252: dividing the tune-down pull-up resistor quantity by the calibrated pull-up resistor quantity to obtain a first waveform available tune-down percentage.

Step S1253: dividing the tune-down pull-down resistor quantity by the calibrated pull-down resistor quantity to obtain a second waveform available tune-down percentage. For example, when the OCD resistance value is 50 ohms, the tune-down pull-up resistor quantity is 2, and the tune-down pull-down resistor quantity is 2. Therefore, the first waveform available tune-up percentage is 2/32=6.3%, and the second waveform available tune-down percentage is 2/28=7.1%.

Step S1254: adding the first waveform available tune-up percentage to the first waveform available tune-down percentage to obtain a first available tuning percentage. For example, the first waveform available tune-up percentage is 18.8%, the first waveform available tune-down percentage is 6.3%, and the first available tuning percentage is 18.8%+6.3%=25.1%.

Step S1255: adding the second waveform available tune-up percentage to the second waveform available tune-down percentage to obtain a second available tuning percentage. For example, the second waveform available tune-up percentage is 21.4%, the second waveform available tune-down percentage is 7.1%, and the second available tuning percentage is 21.4%+7.1%=28.5%.

Step S1256: averaging the first available tuning percentage and the second available tuning percentage to obtain the average adjustable resistor ratio. Therefore, the average adjustable resistor ratio is equal to (25.1+28.5)/2=26.8%.

Therefore, for the aforementioned 16 ODT-OCD resistance combinations, the average adjustable resistor ratios respectively corresponding to the ODT-OCD resistance combinations can be calculated, as shown in Table 1 below.

TABLE 1

|  | OCD 50 ohms | OCD 35 ohm | OCD 25 ohms | OCD 18 ohms |
|---|---|---|---|---|
| ODT 150 ohms | 26.8% | 48.15% | 69.05% | 9.1% |
| ODT 100 ohms | 46.85% | 64.15% | 83.9% | 14.8% |
| ODT 75 ohms | 63.65% | 77.95% | 92% | 14.8% |
| ODT 50 ohms | 83.65% | 93.95% | 95.25% | 14.8% |

As shown in Table 1 above, although under the same OCD resistance, the smaller the ODT resistance, the larger the calculated percentage, in one embodiment of the present disclosure, in order to verify actual adjustable ranges for different reference voltages, circuits are modified to obtain experimental results corresponding to different reference voltages, as shown in Table 2 below:

TABLE 2

| Unit: % VccQ | OCD 50 ohms | OCD 35 ohms | OCD 25 ohms | OCD 18 ohms |
|---|---|---|---|---|
| ODT 150 ohms | 6 | 13 | 14 | 6 |
| ODT 100 ohms | 10 | 15 | 14 | 8 |
| ODT 75 ohms | 11 | 15 | 14 | 9 |
| ODT 50 ohms | 12 | 14 | 14 | 8 |

As shown in Table 2, it is not actually that the eye height when the ODT resistance is 50 ohms is better than other ODT resistance values (150, 100, 75). Since different ODT resistances will affect an amplitude of the waveform and the adjustable range of the signal, it is necessary to further consider different ODT resistances to evaluate the optimal ODT-OCD resistance combination.

Therefore, the signal quality optimization method of the present disclosure proceeds to step S14: configuring the processing device to extract the OCD resistance value with the highest adjustable resistor ratio for the different ODT resistances, so as to obtain a plurality of preferred ODT-OCD resistance combinations.

In step S14, four combinations of the OCD resistance of 25 ohms and ODT resistances of 50/75/100/150 ohms can be selected as preferred ODT-OCD resistance combinations.

Step S16: configuring the processing device to configure the ODT circuit and the OCD circuit according to the preferred ODT-OCD resistance combinations, and performing an operation test process for multiple times on the first circuit and the second circuit, so as to obtain an optimized ODT-OCD resistance combination according to test results of the operation test process that is performed for multiple times.

The way to test various OCD-ODT resistance combinations in this step is to test whether read and write operations can be performed successfully without increasing or decreasing the quantity of the turned-on resistors in the OCD circuit 10 and without changing the reference voltage level based on the calibrated resistor quantity. The test results are shown in Table 3 below:

TABLE 3

| Unit: | OCD 50 ohms | OCD 35 ohms | OCD 25 ohms | OCD 18 ohms |
|---|---|---|---|---|
| PI number |  |  |  |  |
| ODT 150 ohms | 15 | 21 | 18 | 13 |
| ODT 100 ohms | 18 | 20 | 17 | 14 |
| ODT 75 ohms | 20 | 20 | 17 | 14 |
| ODT 50 ohms | 19 | 19 | 17 | 15 |

As shown in Table 3, the combination of the OCD resistance value of 25 ohms and the ODT resistance value of 150 ohms that has the largest time unit when read and write operations are successfully performed can be taken out. This result can be referred to in Table 2, which can be verified by the result of actually changing the eye height of the reference voltage. Therefore, it can be proved that through the signal quality optimization method and signal quality optimization system provided by the present disclosure, one OCD-ODT resistance combination can be selected to ensure that the signal eye diagram has the sufficient eye height.

Beneficial Effects of the Embodiments

In conclusion, in the signal quality optimization method and signal quality optimization system provided by the present disclosure, maximum and minimum values of pull-up resistors (or pull-down resistors) that can meet the self-defined time specification can be counted by adjusting a quantity of OCD resistors, and an available range that each OCD resistance has can be calculated and obtained, so as to automatically find the best OCD-ODT resistance combination, which ensures the signal quality exhibited by the corresponding eye diagram.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A signal quality optimization method applicable to a first circuit and a second circuit electrically connected to each other, and the signal quality optimization method comprising:
    executing a ZQ calibration process on an off-chip driver (OCD) circuit of the first circuit and an on-die termination (ODT) circuit of the second circuit through a ZQ calibration circuit, so as to obtain a plurality of calibrated resistor quantities corresponding to a plurality of OCD resistances and a plurality of corrected ODT resistances, wherein a plurality of ODT-OCD resistance combinations defines relationships between the corrected ODT resistances and the OCD resistances;
    configuring a processing device to perform a waveform test process for each of the ODT-OCD resistance combinations, wherein the waveform test process includes:
        setting a predetermined time rule to determine an operation success condition between the first circuit and the second circuit; and
        adjusting the OCD circuit according to the calibrated resistor quantity corresponding to a target ODT resistance, transmitting a group of test signals between the second circuit and the first circuit, obtaining a signal eye diagram corresponding to the group of test signals, and obtaining an adjustable resistor ratio corresponding to the target ODT resistance by performing repeated adjustments and tests;
    configuring the processing device to extract the OCD resistance value with the highest adjustable resistor ratio for the different ODT resistances, so as to obtain a plurality of preferred ODT-OCD resistance combinations; and
    configuring the processing device to configure the ODT circuit and the OCD circuit according to the preferred ODT-OCD resistance combinations, and performing an operation test process for multiple times on the first circuit and the second circuit, so as to obtain an optimized ODT-OCD resistance combination according to test results of the operation test process that is performed for multiple times.

2. The signal quality optimization method according to claim 1, wherein each of the calibrated resistor quantities includes a calibrated pull-up resistor quantity and a calibrated pull-down resistor quantity, and the steps of adjusting the OCD circuit according to the calibrated resistor quantity corresponding to the target ODT resistance, transmitting the group of test signals between the second circuit and the first circuit and obtaining the signal eye diagram corresponding to the group of test signals further include:
    adjusting, according to the calibrated pull-up resistor quantity and the calibrated pull-down resistor quantity, a pull-up resistor quantity and a pull-down resistor quantity of the OCD circuit, and transmitting the group of test signals, so as to obtain the signal eye diagram corresponding to the group of test signals.

3. The signal quality optimization method according to claim 2, wherein the step of obtaining the adjustable resistor ratio corresponding to the target ODT resistance includes:
    in response to obtaining the signal eye diagram, determining whether or not the signal eye diagram meets the operation success condition, and obtaining a maximum adjustable resistor quantity that meets the operation success condition; and
    calculating and obtaining, according to the maximum adjustable resistor quantity, the calibrated pull-up resistor quantity and the calibrated pull-down resistor quantity, an average adjustable resistor ratio to serve as the adjustable resistor ratio.

4. The signal quality optimization method according to claim 3, wherein the step of adjusting the pull-up resistor quantity and the pull-down resistor quantity of the OCD circuit further includes:
    gradually increasing the pull-up resistor quantity while gradually decreasing the pull-down resistor quantity; and
    gradually decreasing the pull-up resistor quantity while gradually increasing the pull-down resistor quantity.

5. The signal quality optimization method according to claim 3, wherein the step of determining whether or not the signal eye diagram meets the operation success condition, and obtaining the maximum adjustable resistance quantity that meets the operation success condition further includes:
    determining whether or not an eye width of the signal eye diagram is greater than the predetermined time rule, and obtaining, after repeated adjustments and tests are performed, a maximum tune-up resistor quantity and a maximum tune-down resistor quantity previously used to meet the operation success condition.

6. The signal quality optimization method according to claim 5, wherein the maximum tune-up resistor quantity includes a tune-up pull-up resistor quantity and a tune-up pull-down resistor quantity, and the maximum tune-down resistor quantity includes a tune-down pull-up resistor quantity and a tune-down pull-down resistor quantity, and the step of calculating and obtaining the average adjustable resistor ratio according to the maximum adjustable resistor quantity, the calibrated pull-up resistor quantity and the calibrated pull-down resistor quantity further includes:
    dividing the tune-up pull-up resistor quantity by the calibrated pull-up resistor quantity to obtain a first waveform available tune-up percentage;
    dividing the tune-up pull-down resistor quantity by the calibrated pull-down resistor quantity to obtain a second waveform available tune-up percentage;
    dividing the tune-down pull-up resistor quantity by the calibrated pull-up resistor quantity to obtain a first waveform available tune-down percentage;
    dividing the tune-down pull-down resistor quantity by the calibrated pull-down resistor quantity to obtain a second waveform available tune-down percentage;

adding the first waveform available tune-up percentage to the first waveform available tune-down percentage to obtain a first available tuning percentage;

adding the second waveform available tune-up percentage to the second waveform available tune-down percentage to obtain a second available tuning percentage; and averaging the first available tuning percentage and the second available tuning percentage to obtain the average adjustable resistor ratio.

7. The signal quality optimization method according to claim 1, wherein the first circuit is a memory controller circuit, the second circuit is a memory circuit, the operation success condition is a read operation success condition or a write operation success condition, and the operation test process is a read operation test or a write operation test.

8. The signal quality optimization method according to claim 7, wherein the step of transmitting the group of test signals between the second circuit and the first circuit to obtain the signal eye diagram corresponding to the group of test signals further includes: configuring the first circuit to perform a write operation on the second circuit in a predetermined test frequency.

9. The signal quality optimization method according to claim 1, wherein the OCD circuit includes:
a pull-up resistor circuit including a plurality of pull-up resistors and a plurality of first control switches, each of the pull-up resistors and the corresponding first control switch are connected in series between a power supply voltage and an input-output terminal;
a pull-down resistor circuit including a plurality of pull-down resistors and a plurality of second control switches respectively corresponding to the pull-down resistors, each of the pull-down resistors and a corresponding one of the second control switches are connected in series between the input-output terminal and a ground terminal; and
a control circuit configured to control the first control switches and the second control switches to adjust the pull-up resistor quantity and the pull-down resistor quantity.

10. The signal quality optimization method according to claim 9, wherein the first circuit and the second circuit are connected to the input-output terminal.

11. A signal quality optimization system, comprising:
a first circuit including an off-chip driver (OCD) circuit;
a second circuit including an on-die termination (ODT) circuit;
a ZQ calibration circuit electrically connected to the OCD circuit and the ODT circuit, wherein the ZQ calibration circuit is configured to execute a ZQ calibration process to obtain a plurality of calibrated resistor quantities corresponding to a plurality of OCD resistances and a plurality of corrected ODT resistances, and a plurality of ODT-OCD resistance combinations define relationships between the corrected ODT resistances and the OCD resistances;
a processing device configured to execute a waveform test process for each of the ODT-OCD resistance combinations, wherein the waveform test process includes:
setting a predetermined time rule to determine an operation success condition between the first circuit and the second circuit; and
adjusting the OCD circuit according to the calibrated resistor quantity corresponding to a target ODT resistance, transmitting a group of test signals between the second circuit and the first circuit, obtaining a signal eye diagram corresponding to the group of test signals, and obtaining an adjustable resistor ratio corresponding to the target ODT resistance by performing repeated adjustments and tests;
wherein the processing device is further configured to:
extract the OCD resistance value with the highest adjustable resistor ratio for the different ODT resistances, so as to obtain a plurality of preferred ODT-OCD resistance combinations; and
configure the ODT circuit and the OCD circuit according to the preferred ODT-OCD resistance combinations, and perform an operation test process for multiple times on the first circuit and the second circuit, so as to obtain an optimized ODT-OCD resistance combination according to test results of the operation test process that is performed for multiple times.

12. The signal quality optimization system according to claim 11, wherein each of the calibrated resistor quantities includes a calibrated pull-up resistor quantity and a calibrated pull-down resistor quantity, and the steps of adjusting the OCD circuit according to the calibrated resistor quantity corresponding to the target ODT resistance, transmitting the group of test signals between the second circuit and the first circuit and obtaining the signal eye diagram corresponding to the group of test signals further include:
adjusting, according to the calibrated pull-up resistor quantity and the calibrated pull-down resistor quantity, a pull-up resistor quantity and a pull-down resistor quantity of the OCD circuit, and transmitting the group of test signals, so as to obtain the signal eye diagram corresponding to the group of test signals.

13. The signal quality optimization system according to claim 12, wherein the step of obtaining the adjustable resistor ratio corresponding to the target ODT resistance includes:
in response to obtaining the signal eye diagram, determining whether or not the signal eye diagram meets the operation success condition, and obtaining a maximum adjustable resistor quantity that meets the operation success condition; and
calculating and obtaining, according to the maximum adjustable resistor quantity, the calibrated pull-up resistor quantity and the calibrated pull-down resistor quantity, an average adjustable resistor ratio to serve as the adjustable resistor ratio.

14. The signal quality optimization system according to claim 13, wherein the step of adjusting the pull-up resistor quantity and the pull-down resistor quantity of the OCD circuit further includes:
gradually increasing the pull-up resistor quantity while gradually decreasing the pull-down resistor quantity; and
gradually decreasing the pull-up resistor quantity while gradually increasing the pull-down resistor quantity.

15. The signal quality optimization system according to claim 13, wherein the step of determining whether or not the signal eye diagram meets the operation success condition, and obtaining the maximum adjustable resistance quantity that meets the operation success condition further includes:
determining whether or not an eye width of the signal eye diagram is greater than the predetermined time rule, and obtaining, after repeated adjustments and tests are performed, a maximum tune-up resistor quantity and a maximum tune-down resistor quantity previously used to meet the operation success condition.

16. The signal quality optimization system according to claim 15, wherein the maximum tune-up resistor quantity includes a tune-up pull-up resistor quantity and a tune-up pull-down resistor quantity, and the maximum tune-down resistor quantity includes a tune-down pull-up resistor quantity and a tune-down pull-down resistor quantity, and the step of calculating and obtaining the average adjustable resistor ratio according to the maximum adjustable resistor quantity, the calibrated pull-up resistor quantity and the calibrated pull-down resistor quantity further includes:

dividing the tune-up pull-up resistor quantity by the calibrated pull-up resistor quantity to obtain a first waveform available tune-up percentage;

dividing the tune-up pull-down resistor quantity by the calibrated pull-down resistor quantity to obtain a second waveform available tune-up percentage;

dividing the tune-down pull-up resistor quantity by the calibrated pull-up resistor quantity to obtain a first waveform available tune-down percentage;

dividing the tune-down pull-down resistor quantity by the calibrated pull-down resistor quantity to obtain a second waveform available tune-down percentage;

adding the first waveform available tune-up percentage to the first waveform available tune-down percentage to obtain a first available tuning percentage;

adding the second waveform available tune-up percentage to the second waveform available tune-down percentage to obtain a second available tuning percentage; and averaging the first available tuning percentage and the second available tuning percentage to obtain the average adjustable resistor ratio.

17. The signal quality optimization system according to claim 1, wherein the first circuit is a memory controller circuit, the second circuit is a memory circuit, the operation success condition is a read operation success condition or a write operation success condition, and the operation test process is a read operation test or a write operation test.

18. The signal quality optimization system according to claim 17, wherein in the step of transmitting the group of test signals between the second circuit and the first circuit to obtain the signal eye diagram corresponding to the group of test signals, the first circuit is configured to perform a write operation on the second circuit in a predetermined test frequency.

19. The signal quality optimization system according to claim 11, wherein the OCD circuit includes:

a pull-up resistor circuit including a plurality of pull-up resistors and a plurality of first control switches, each of the pull-up resistors and the corresponding first control switch are connected in series between a power supply voltage and an input-output terminal;

a pull-down resistor circuit including a plurality of pull-down resistors and a plurality of second control switches respectively corresponding to the pull-down resistors, each of the pull-down resistors and a corresponding one of the second control switches are connected in series between the input-output terminal and a ground terminal; and a control circuit configured to control the first control switches and the second control switches to adjust the pull-up resistor quantity and the pull-down resistor quantity.

20. The signal quality optimization system according to claim 9, wherein the first circuit and the second circuit are connected to the input-output terminal.

\* \* \* \* \*